(12) United States Patent
Fairchok et al.

(10) Patent No.: US 6,610,260 B1
(45) Date of Patent: Aug. 26, 2003

(54) VAPOR PROCESSOR WITH CONDENSATE REFLUX

(75) Inventors: Joel Fairchok, Alexander, NY (US); Victor W. Logan, Naples, NY (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/502,741

(22) Filed: Feb. 11, 2000

(51) Int. Cl.[7] .................................................. B01J 12/00
(52) U.S. Cl. ........................................ 422/236; 261/116
(58) Field of Search ................................ 422/189, 190, 422/198, 200, 202, 236, 129, 307, 308; 429/17, 20; 261/116

(56) References Cited

U.S. PATENT DOCUMENTS

| | | | | |
|---|---|---|---|---|
| 3,796,207 A | * | 3/1974 | Olson | 422/199 |
| 3,853,484 A | * | 12/1974 | Sudar | 423/212 X |
| 3,905,553 A | * | 9/1975 | Bradley et al. | 239/124 |
| 6,171,558 B1 | * | 1/2001 | Simpson | 422/186.3 |

FOREIGN PATENT DOCUMENTS

EP 287035 * 10/1988

OTHER PUBLICATIONS

SN 09/187125 filed Nov. 5, 1998 Glenn Skala et al. entitled "Thermally Integrated Staged Methanol Reformer and Method".

* cited by examiner

Primary Examiner—Stephen Kalafut
(74) Attorney, Agent, or Firm—Cary W. Brooks

(57) ABSTRACT

Vapor processor having an aspirator for collecting condensate pooled in the sump region and reintroducing it into a vapor stream being processed.

7 Claims, 1 Drawing Sheet

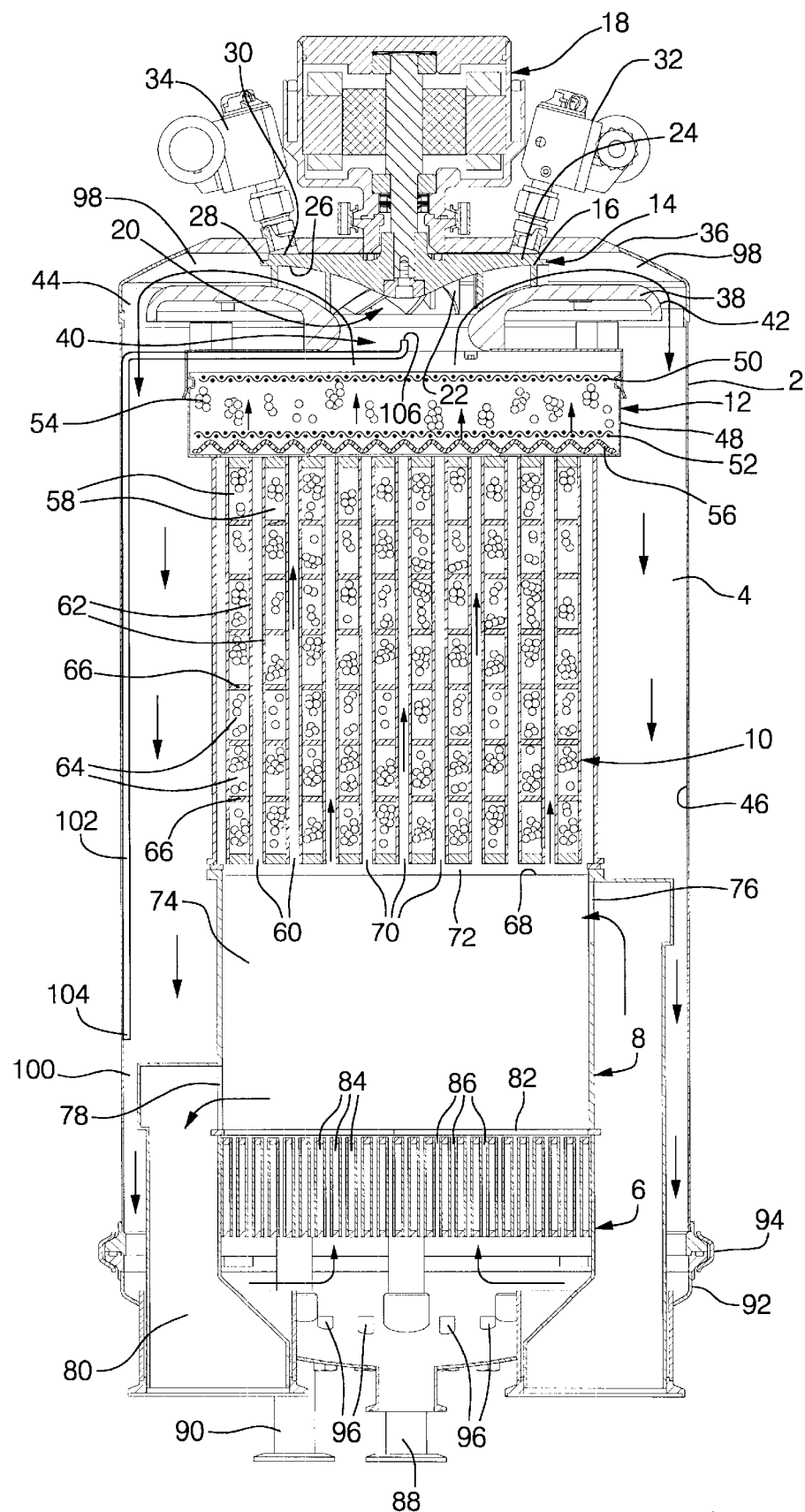

VAPOR PROCESSOR WITH CONDENSATE REFLUX

TECHNICAL FIELD

This invention relates to vapor processing equipment, and more particularly to means for recycling condensate formed therein to the vapor stream being processed in such equipment, and more particularly yet to fuel processors for generating $H_2$ for $H_2$-fueled fuel cells.

BACKGROUND OF THE INVENTION

Vapor processors are well known in the art and include a variety of different types of equipment such as chemical reactors, heat exchangers, liquid-gas separators, humidifiers, inter alia. Such processors typically comprise a housing defining a chamber in which a desired process (e.g. chemical reaction, etc.) is carried out. Condensate from the vapor(s) being processed often undesirably forms in the processors and pools in a sump or low area thereof. Condensate pooling can degrade the performance of the processor in a number of ways depending on the nature of the processor. For example, in the case of a reactor for chemically reacting one vapor with another, or with a gas, loss of some of the vapor as condensate can upset the stoichiometry of the vapor phase reaction which, in turn, can significantly impact the efficiency or yield from the reaction. Moreover, when condensate forms or later evaporates in such reactors, control of the reactor becomes extremely difficult because of the constantly varying conditions.

The presence of a pool of condensate can cause other disruptions as well. One particularly undesirable disruption occurs in the operation of fuel processors that convert liquid hydrocarbons to hydrogen for fueling electrochemical fuel cells used for motive power applications (e. g. vehicle propulsion). One such fuel processor, for example, is described in U.S.Patent Application U.S. Ser. No. 09/187, 125 (now U.S. Pat. No. 6,238,815) filed in the names of Glenn Skala, et al. on Nov. 5, 1998, and assigned to the assignee of the present invention. U.S. Ser. No. 09/187,125 (i.e. U.S. Pat. No. 6,238,815) is hereby incorporated herein by reference, in its entirety, and generally relates to a fuel processor for reacting methanol vapor with steam (i.e. a steam reformer) to produce hydrogen for fueling a PEM $H_2$—$O_2$ fuel cell used to propel a vehicle. More specifically, U.S. Ser. No. 09/187,125 (i.e. U.S. Pat. No. 6,238,815) describes a thermally-integrated, two-stage, methanol reformer including a heat exchanger, and first and second catalytic reactors collocated in a common housing in which a vaporous working fluid circulates. In processors such as this, condensate from the working fluid can form on the inside surfaces of the housing and pool in the low sump area(s) of the processor. When the vehicle carrying the fuel processor moves, the condensate pool sloshes back and forth on the floor of the housing which causes some of the condensate to become entrained in the working fluid in the form of liquid droplets. These droplets are then carried into the catalyst by the working fluid which causes a rapid rise in the reaction temperature which, in turn, upsets the reaction kinetics and drives up the amount of carbon monoxide produced by the reaction. Not only does control of the reaction under such circumstances become extremely difficult, but additional means must be provided to remove the additional CO produced before the processor's effluent can be used in a fuel cell which is intolerant of high concentrations of carbon monoxide. Similar problems can occur in fuel processors used to convert other liquid hydrocarbons (e.g. gasoline) to $H_2$-rich fuel for fuel cells.

The present invention is an inexpensive, refluxing technique for removing any condensate that collects in a sump of a vapor processor and reintroducing it into the vapor stream being processed by that processor.

SUMMARY OF THE INVENTION

In its broadest sense, the invention contemplates a vapor processor having an aspirator that removes the condensate from the sump and reintroduces it back into the vapor stream being processed.

According to a preferred embodiment, the invention involves a vapor processor that has a housing defining a chamber for processing a stream of condensable vapor, which chamber has a first region that operates at a first pressure, a second region that operates at a second pressure that is less than the first pressure, and a sump in the first region that collects condensate condensed from the vapor. In accordance with the present invention, an aspirator is provided that communicates the sump with the second region. Because of the pressure difference between the sump and the second region, the aspirator draws condensate out of the sump and transfers it to the second region for reintroduction into the stream. In one embodiment of the invention, the vapor processor is a chemical reactor having a housing that defines a chamber in which a stream of condensable vapors are reacted. The reactor includes a vaporization section which operates at a pressure greater than the first region and in which vapors are formed by vaporizing corresponding liquids thereof that are introduced (e.g. injected) into the vaporization region from outside the reactor. The aspirator communicates the sump with the second region for transferring the condensate from the sump to the second region and thence into the vaporization region of the chamber. Preferably, the aspirator comprises a conduit (e.g. tube) having one end in the sump and the other end in the second region, and the differential pressure between the two is the sole means driving the condensate through the conduit.

A most preferred embodiment of the invention involves a fuel processor for converting a liquid hydrocarbon (HC) fuel to hydrogen.($H_2$) gas for fueling a fuel cell. The fuel processor includes a housing defining a reaction chamber that contains a catalyst for effecting the HC→$H_2$ conversion, at least one inlet to the housing for introducing the hydrocarbon and water into the housing, and a vaporization section of the chamber adjacent the inlet for converting the liquid hydrocarbon and water to hydrocarbon and water vapors. A fan having a low pressure input side and higher pressure exhaust side draws the vapors into the fan and circulates them throughout the housing. The chamber has a region that operates at a higher pressure than the low pressure side of the fan, a sump in the higher, pressure region that collects condensate condensed from the vapors, and an aspirator that communicates the sump with the low pressure side of the fan for transferring the condensate by differential pressure alone from the sump into the fan and thence into the vaporization section for vaporization therein. More preferably, the fan includes an impeller having a plurality of blades which draw the vapors into its center and discharge them radially outwardly from there, and the aspirator discharges the condensate into the center of the impeller. Most preferably, the fuel processor also has at least one inlet adapted to impinge the hydrocarbon and water onto the impeller in such a manner that the impeller atomizes them in the vaporization section.

BRIEF DESCRIPTION OF THE DRAWING

The invention will better be understood when considered in the light of the following detailed description of a preferred embodiment thereof, which is given hereafter in conjunction with the FIGURE which is a sectioned side view of the fuel processor described in U.S. Pat. No. 6,238,815 supra, which has been incorporated in its entirety herein by reference.

DETAILED DESCRIPTION OF A PREFERRED EMBODIMENT

The fuel processor comprises a housing 2 defining a chamber 4 that contains a number of distinct functional components including a preferential oxidation (PrOx) reactor 6, a combustion-gas-heated heat exchanger 8, an isothermal catalytic, plug flow reactor 10 (i.e., first reactor), a second catalytic reactor 12, and a fan 14, all located within, and along the central axis, of the housing 2. Each of these functional components is housed within its own canister, housing or shell which separates the innards thereof, and the vapors flowing therein, from the annulus in the chamber 4 that surrounds the components. Each of the functional components are open ended and aligned with the others so that a working fluid can flow sequentially therethrough along the central axis of the processor without mixing with that portion of the working fluid that flows in the annulus around the components in the chamber 4.

The fan 14 comprises a rotating impeller 16 that circulates a heat transfer medium (i.e. the working fluid) throughout the housing 2 and around the outsides of the PrOx reactor 6, the heat exchanger 8, the first reactor 10 and the second reactor 12, as shown by the arrows in the FIGURE. The impeller 16 is driven by a motor 18, and draws the circulating fluid into its center 20. Blades 22 on the impeller 16 pump the circulating fluid to the perimeter of the impeller 16, and discharge it therefrom. The impeller 16 preferably comprises a circular plate 24 having a front face 26 that carries the blades 22, and a back face 28 which carries a plurality of radially extending veins 30 which serve to break up and atomize liquid methanol and water which are injected into the housing 2 through methanol injector 32 and water injector 34, respectively, so as to impinge onto the back face 28 of the plate 24. The impeller 16 atomizes and flings liquid methanol and water into a vaporization section 98 at the end of the chamber 4.

Preferably, the methanol and water injectors 32 and 34, respectively, are conventional liquid injectors like the fuel injectors used in internal combustion engines. The fan 14 is secured to a cover 36 which is attached to one end of the housing 2 by clamping, welding or the like. An annular, donut-like baffle 38 is positioned in the housing 2 adjacent the blades 22. The baffle 38 has a central opening 40 through which the working fluid is drawn into the impeller 16, and is spaced from the walls of the housing 2 at its perimeter 42 so as to provide an annular gap 44 between it and the housing 2 such that vapors pumped by the fan 14 can circulate through the housing 2 in the annulus between the wall 46 and the functional components, and thence through the aligned components along the central axis of the fuel processor (see flow arrows in the FIGURE).

The second reactor 12 is positioned adjacent the baffle 38 and comprises a sheet metal container/shell 48 having a pair of screens 50 and 52 at either end thereof and housing catalyst beads 54. The first stage of a two-stage reforming reaction occurs in reactor 12 (see U.S. Pat. No. 6,238,815 supra). The screens 50 and 52 allow the working fluid to pass therethrough and through the catalyst beads 54, while preventing the beads 54 from the catalyst bed from escaping at the container 48. The screen 52 rests atop a perforated corrugated plate 56 that separates the second reactor 12 from the first reactor 10 and allows for a more uniform distribution of the circulating working fluid through the bed of catalyst beads 54. In the second reactor 12, the working fluid comes into direct contact with the catalyst beads 54 which serve to promote a first stage reaction between some of the methanol vapor and water vapor contained within the working fluid circulating through the housing 2.

Upstream of the second reactor 12 is the first reactor 10 as best explained in U.S. Pat. No. 6,238,815 supra. The first reactor 10 is essentially a cross-flow, plate-and-bar type heat exchanger. The reactor 10 includes a plurality of catalyst-containing first channels 58 on its cold side through which a small portion of the working fluid circulating within the housing 2 is shunted or drawn off from atop the second stage reactor 12. The portion of the working fluid that is diverted/shunted to the first reactor 10 is captured by a scoop (not shown) adjacent the top of the catalyst beads 54 in the second reactor 12 so as to collect working fluid which has freshly reacted in the second reactor 12 close to the operating temperature of the first reactor 10. The working fluid captured/collected by the scoop flows through a shunt tube (not shown) to an inlet header (not shown) to the first reactor 10. The first reactor 10 contains second channels 60 on its hot side located interjacent the first channels 58, and through which the working fluid flows to transfer heat from the working fluid into the first channels 58 to heat the catalyst therein for effecting the second stage reforming reaction. Thermally conductive partitions 62 separate the first channels 58 from the second channels 60. The first channels 58 are themselves divided into sections 64 by partitions 66 which are arranged in the reactor 10 so as to cause the portion of the working fluid undergoing the second stage reforming reaction to move back and forth through the first reactor 10 in a serpentine fashion to provide maximum residence time of such portion in contact with the catalyst beads therein and thereby insure substantially complete reaction of the remaining methanol and water vapor in the drawn-off portion of the working fluid.

The heat exchanger 8 is positioned adjacent the first reactor 10 such that the outlet 68 of the heat exchanger 8 confronts the inlets 70 to the second channels 60 of the first reactor 10 across a gap 72 in which the heated gases mix and thermally equilibrate before entering the first reactor 10. The heat exchanger 8 may be a cross-flow plate and bar type heat exchanger and has a hot side including a plurality of first conduits through which a heating fluid (e.g. combustion gases from a catalytic burner) flows, and a cold side including a plurality of second conduits through which the working fluid flows. The hot side and cold side of the heat exchanger are separated from each other by thermally conductive barriers 74. Exhaust gases from a combuster external to the reactor pass through the hot side of the heat exchanger 8 from an inlet 76 thereto to heat the working fluid passing through the cold side of the heat exchanger 8. An outlet 78 from the heat exchanger 8 conveys the spent combuster gases from the heat exchanger 8 out of the housing 2 via conduit 80.

An exothermal PrOx reactor 6 is positioned downstream of the fan 14 (i.e., in the direction of working fluid flow), and upstream of the heat exchanger 8 from which it is separated by a mixing space 82 like the gap 72. The PrOx reactor 6 may be a bar-and-plate type cross-flow heat exchanger and has a hot side comprising a plurality of conduits 84 through which the reformate exiting the first reactor 10 passes and is reacted with air to reduce the carbon monoxide content thereof. Preferably, the PrOx reactor will be configured so the reformate flows therethrough in a serpentine path like that in the reactor 10, but wherein the general direction of flow is counter current (i.e., opposite) to that of the heat transfer medium. The hot side of the walls of the conduits 8 are coated with a suitable catalyst for promoting the PrOx reaction. The PrOx reactor 6 also has a cold side comprising a plurality of conduits 86 which are separated from the hot side by thermally conductive barriers 8 and through which the working fluid circulating within the housing 2 passes and is heated before entering the inlet to the heat exchanger 8. An inlet pipe 88 directs reformate from the conduit 90 into an inlet manifold (not shown) to the PrOx reactor 6 via a coupling (not shown) external to the housing 2. An outlet manifold (not shown) conducts gases treated in the PrOx reactor 6 to a PrOx exhaust tube (not shown).

The housing 2 is suitably sealed by closure member 92 held in place by a clamping band 94. The closure member 92 includes a number of access ports 96 through which connections are made to appropriate system monitors/sensors located at various sites throughout the housing 2 to monitor temperature or other conditions at different locations in the housing 2.

The aforesaid reactor functions in the manner described in U.S. Ser. No. 09/187,125, supra, which will not be repeated in detail here. Simply however, that reactor utilizes a working fluid comprising methanol vapor, water vapor, carbon dioxide and hydrogen, as both a reactant stream and a heat transfer medium. The working fluid is formed in the second reactor 12, and is circulated throughout the chamber to carry heat from one system component to the next. A small portion of the circulating fluid is drawn off and reacted in the first reactor 10 which completes the reaction between the methanol and water vapors. The effluent from the first reactor 10 then passes through the PrOx reactor 6 (i.e. with or without an intermediate water-gas-shift reactor) to remove most of any CO therein. Liquid methanol and water are injected into the device via injectors 32 and 34, respectively, to make up for the methanol and water consumed in the reformation reactions and exhausted from the first reactor 10. Heat is inputted to the reactor from an external combuster via heat exchanger 8.

The chamber 4 that houses the reactors 6, 10 and 12 and heat exchanger 8, has a relatively high pressure region at the exhaust end of the fan 14, and, downstream therefrom, a relatively low pressure region at the central opening 40 of the baffle 38 at the inlet to the fan 14 at the center 20 of the impeller 16. The region 98 immediately adjacent the exhaust end of the fan 14, and lying between the baffle 38 and the cover 36, is the primary vaporization section of the reactor and lies in the high pressure region of the reactor. In operation, this reactor is oriented 90 degrees from the way it is presented in the FIGURE such that its longitudinal axis is horizontal. In such orientation, water and hydrocarbon condensing on the inside wall 46 of the housing 2 runs down the wall 46 and pool in a low, or sump, area 100 of the chamber 4. When the reactor is used in a moving vehicle, the pooled condensate (1) sloshes and splashes around in the sump area, (2) becomes entrained in the working fluid, and (3) is carried as liquid droplets, into the first and second reactors 12 and 10, respectively, which causes rapid localized heating thereof which, in turn, upsets the kinetics, and control, of the reaction occurring therein. The net affect is that the fuel processor operates at uncontrollable elevated temperatures and the effluent therefrom contains excessive amounts of CO.

In accordance with the present invention, the aforesaid problems associated with pooling of condensate in the sump is eliminated by providing an aspirator 102 that sucks the condensate from the sump 100 and reintroduces it back into the working fluid in a region of the processor more favorable to vaporization of the condensate than the floor of the chamber 4. In this regard, and in accordance with a preferred embodiment of the invention, the aspirator 102 is a conduit (e.g. hollow tube) that has one end 104 at the sump 100 which is in the high pressure region of the processor. The opposite end 106 of the conduit 102 is at a low pressure region of the processor, e.g., at the inlet to the fan 14 at the center 20 of its impeller 16. The differential pressure that exists between the sump 100 and the inlet to the fan 14 provides the driving force for moving the condensate from the sump to the fan inlet. The condensate sucked from the sump 100 spews from the end 106 of the aspirator 102 onto the blades 22 of the impeller 16 which helps to atomize the condensate and facilitate its vaporization in the vaporization region 98. This technique for reintroducing the condensate back into the working fluid is preferred because of its simplicity and cost effectiveness. Alternatively however, the conduit could include a small electric pump, could be routed externally to the housing 2, and could discharge the condensate somewhere else in the chamber that is more favorable to vaporization thereof than the sump 100.

While the invention has been disclosed in terms of specific embodiments thereof it is not intended to be limited thereto but rather only to the extent set forth hereafter in the claims which follow.

What is claimed is:

1. A vapor processor comprising a housing defining a chamber for processing a stream of vapor from which condensate precipitates, said chamber having a first region that operates at a first pressure and a second region that operates at a second pressure that is less than said first pressure, a condensate-sump in said first region where said condensate can accumulate during the operation of said processor, and an aspirator communicating said condensate-sump with said second region for sucking said condensate out of said condensate-sump and transferring it to said second region for substantial elimination from said condensate-sump and revaporization in said stream.

2. A chemical reactor comprising a housing defining a reaction chamber in which condensable vapors chemically react, said chamber having (a) a first region that operates at a first pressure, (b) a second region that operates at a second pressure that is less than said first pressure, (c) a vaporization region adjacent said second region that operates at a pressure greater than said first region and wherein said vapors are formed by vaporizing corresponding liquids thereof introduced into said vaporization region, (d) a condensate-sump in said first region that collects condensate condensed from said vapors, and (e) an aspirator communicating said sump with said second region for transferring said condensate from said sump to said second region for introduction into said vaporization region.

3. A fuel processor for converting a liquid hydrocarbon fuel to hydrogen gas for fueling a fuel cell, said fuel processor comprising a housing defining a reaction chamber containing a catalyst for effecting said converting, at least one inlet to said housing for introducing said hydrocarbon and water into said housing, a vaporization section adjacent said inlet for converting said liquid hydrocarbon and water to hydrocarbon and water vapors respectively, a fan for circulating said vapors throughout said housing, said fan having an input side for drawing said vapors into the fan and an exhaust side for discharging said vapors from said fan, said chamber having a region that operates at a higher pressure than the pressure at the input side of said fan, a condensate-sump in said region that collects condensate condensed from said vapors in said chamber, and an aspirator communicating said sump with said input side of said fan for transferring said condensate from said sump into said fan and thence into said vaporization section for vaporization therein.

4. The fuel processor according to claim 3 wherein said fan includes an impeller having a plurality of blades arranged and configured to draw said vapors into the center of said impeller and discharge said vapors radially outwardly from said center, and said aspirator is arranged and configured to discharge said condensate into said center of said impeller.

5. The fuel processor according to claim 4 wherein said at least one inlet is adapted to impinge said hydrocarbon and water onto said impeller such that said impeller atomizes said hydrocarbon and water in said vaporization section.

6. The chemical reactor according to claim 2 wherein said aspirator comprises a conduit having a first end in said condensate-sump and a second end in said second region.

7. The fuel processor according to claim 3 wherein said aspirator comprises a conduit having a first end in said sump and a second end at the input side of said fan.

* * * * *